(12) United States Patent
Verde Preckler

(10) Patent No.: US 8,573,538 B2
(45) Date of Patent: Nov. 5, 2013

(54) IMPACT RESISTANT AIRCRAFT FUSELAGE

(75) Inventor: Jorge Pablo Verde Preckler, Madrid (ES)

(73) Assignee: Airbus Operations S.L., Madrid (ES)

( * ) Notice: Subject to any disclaimer, the term of this patent is extended or adjusted under 35 U.S.C. 154(b) by 715 days.

(21) Appl. No.: 12/012,009

(22) Filed: Jan. 30, 2008

(65) Prior Publication Data

US 2009/0140096 A1 Jun. 4, 2009

(30) Foreign Application Priority Data

Nov. 30, 2007 (ES) .................................. 200703181

(51) Int. Cl.
*B64C 1/00* (2006.01)
*B64D 7/00* (2006.01)

(52) U.S. Cl.
USPC ............................ 244/121; 244/119; 244/120

(58) Field of Classification Search
USPC .................. 244/1 N, 119, 120, 121
See application file for complete search history.

(56) References Cited

U.S. PATENT DOCUMENTS

| | | | | | |
|---|---|---|---|---|---|
| 2,382,817 | A | * | 8/1945 | Reiss | 244/5 |
| 2,420,292 | A | * | 5/1947 | Baer et al. | 52/561 |
| 3,740,905 | A | * | 6/1973 | Adams | 52/404.3 |
| 3,867,244 | A | * | 2/1975 | Adams | 428/182 |
| 4,235,398 | A | * | 11/1980 | Johnson | 244/119 |
| 4,291,851 | A | * | 9/1981 | Johnson | 244/119 |
| 4,976,396 | A | * | 12/1990 | Carlson et al. | 244/55 |
| 5,577,688 | A | * | 11/1996 | Sloan | 244/117 R |
| 5,779,193 | A | * | 7/1998 | Sloan | 244/117 R |
| 2005/0211838 | A1 | * | 9/2005 | Struve et al. | 244/119 |

* cited by examiner

*Primary Examiner* — Philip J Bonzell
(74) *Attorney, Agent, or Firm* — Ladas & Parry LLP

(57) ABSTRACT

The invention relates to a structural configuration of the rear fuselage (4) of an aircraft with propeller engines (1) comprising propellers (23) formed in turn by blades (3), the mentioned propeller engines (1) being located at the rear part of the aircraft and the empennage (5) of the aircraft in turn being located behind the plane of the propellers (23), characterized in that the structural configuration of the rear fuselage (4) comprises an outer skin (6) and an inner skin (7), both skins (6, 7) being joined by means of radial elements (13) configuring cells (14), such that the obtained structural configuration maximizes the torsional strength of the rear fuselage (4) of the aircraft in the event of damage of the mentioned rear fuselage (4) due to the detachment of one of the blades (3) of the propeller engines (1).

5 Claims, 2 Drawing Sheets

IMPACT RESISTANT AIRCRAFT FUSELAGE

FIELD OF THE INVENTION

The present invention relates to an impact resistant fuselage for aircraft with propeller engines located at the rear part and with the empennage located behind the plane of the propellers.

BACKGROUND OF THE INVENTION

A failure in the engine causing the detachment of one of the blades of the propeller can impact against the rear fuselage at high speed, sectioning it. In this emergency condition, the aircraft operates with only one engine generating a forward thrust, outside the plane of symmetry of the airplane. This thrust causes a yawing moment which must be balanced with a side aerodynamic force caused by the vertical stabilizer of the empennage, so that the aircraft can continue navigating stably. As the vertical stabilizer is located above the rear fuselage, this side aerodynamic force generates a torsion along the rear fuselage. If the blade impacts against the fuselage and sections it, the torsional strength of the fuselage is considerably reduced because the torsional rigidity of a closed section is proportional to the total area enclosed by the section, whereas the torsional rigidity of an open section is proportional to the material area of the section. It is therefore essential to design a section having multiple independent closed cells such that in the event of damage, there remains residually sufficient area with a closed section to support the torsion caused by the empennage in the emergency condition of an engine shutdown.

Propeller engines are usually located in the wing such that the detachment of a propeller can impact the central fuselage, in front of the wing. In this area of the fuselage, the torsion that the mentioned fuselage must support is relatively low, and is not a critical emergency condition. This has caused the residual torsional rigidity after impact to not be considered a critical factor in the design of fuselages up until now. However, this condition changes when the propeller engines are located at the rear part of the aircraft in front of the empennage, because then the torque generated by the empennage due to the failure of an engine is very high causing a catastrophic situation for the aircraft which must be prevented.

Another additional advantage is that the design of the fuselage according to the present invention considerably reduces the noise caused by the propellers of operating engines, which noise is propagated through the fuselage skin, reaching the passenger cabin.

The present invention is aimed at satisfying this demand.

SUMMARY OF THE INVENTION

The objective of this invention is a structural configuration of the rear fuselage of an aircraft with propeller engines, the mentioned propeller engines being located at the rear part of the aircraft, in which the empennage is located behind the plane of the propellers. The structural configuration proposed by the invention is highly resistant to the torsional loads coming from the empennage of the aircraft in the event of damage in the fuselage thereof due to the detachment of one of the blades of the propeller engine.

The present invention develops a rear fuselage of an aircraft comprising a double resistant shell joined by means of radial ribs. The fuselage skin of the aircraft in turn comprises multiple closed cells, such that a possible damage sectioning the fuselage will still residually leave many closed cells. As the torsional strength of a section is proportional to the area enclosed by the closed cells, sufficient residual torsional strength is ensured by means of the invention so that the aircraft can reach the closest airport without a catastrophic failure of the structure thereof occurring.

The present invention is particularly aimed at the civil aviation field of propeller engines located at the rear part of the aircraft and the empennage located behind the plane of the propellers, considerably increasing the resistance to damage, specifically the torsional strength of the fuselage.

Other features and advantages of the present invention will be inferred from the following detailed description of an illustrative embodiment of its object in relation to the attached figures.

DETAILED DESCRIPTION OF THE INVENTION

Figure 1:
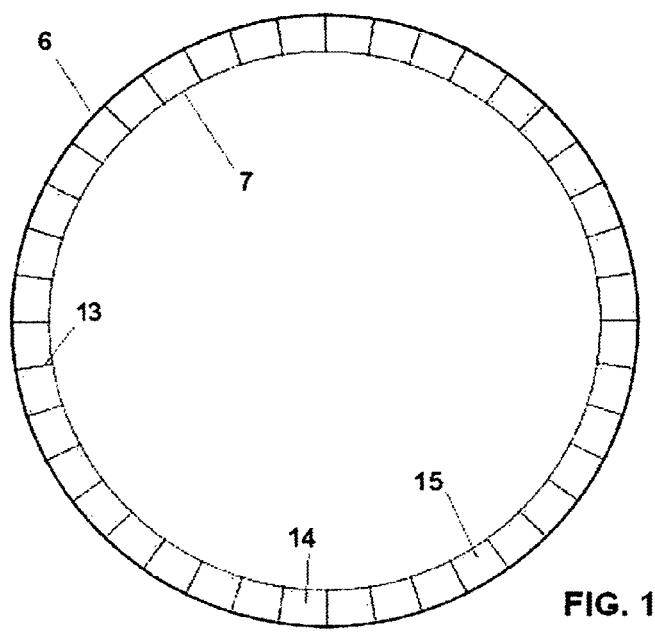
FIG. 1 shows a schematic view of the section, in a plane perpendicular to the flight axis of the aircraft, of the rear fuselage of an aircraft according to the present invention.

According to the invention (see FIG. 1), the rear fuselage 4 of an aircraft comprises an outer casing or skin 6 and an inner casing or skin 7, both skins 6 and 7 being joined by means of radial elements 13. The cells 14 resulting from the previous configuration of fuselage 4 will preferably be filled with a not very dense resistant material 15, such that this filling of material 15 has the effect of preventing the local buckling of the cells 14 of the structure, thus stabilizing the thin-walled multi-cell structure of the fuselage 4.

Figure 2:
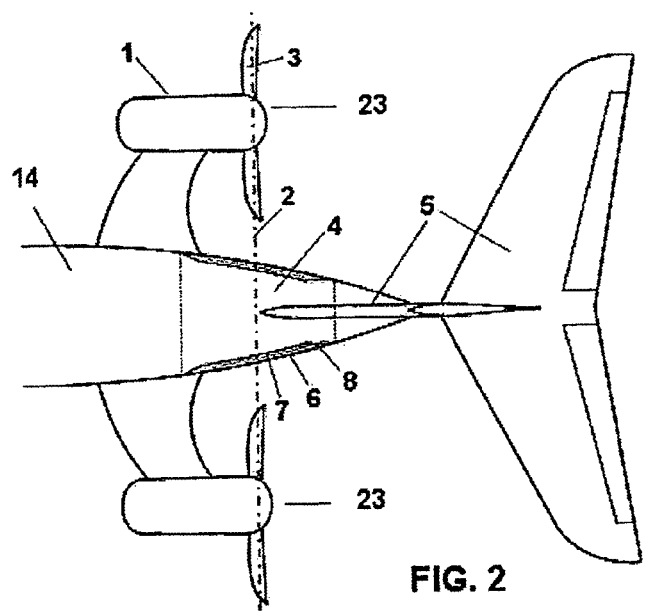
FIG. 2 shows a schematic plan view of the rear part of an aircraft with propeller engines located at the rear part thereof, and with the rear fuselage according to the present invention.

The propeller engines 1 of the aircraft can be attached to the fuselage 14 of the aircraft (as shown in FIG. 2) or to another place. Said Figure shows the plane 2 of the propellers 23, the blades 3 of a propeller 23, the empennage 5 of the aircraft and the rear fuselage area 4 which can be damaged, the rear fuselage 4 comprising an outer skin 6, an inner skin 7 and a transition area 8 between the fuselage 14 and the rear fuselage 4.

Figure 4:
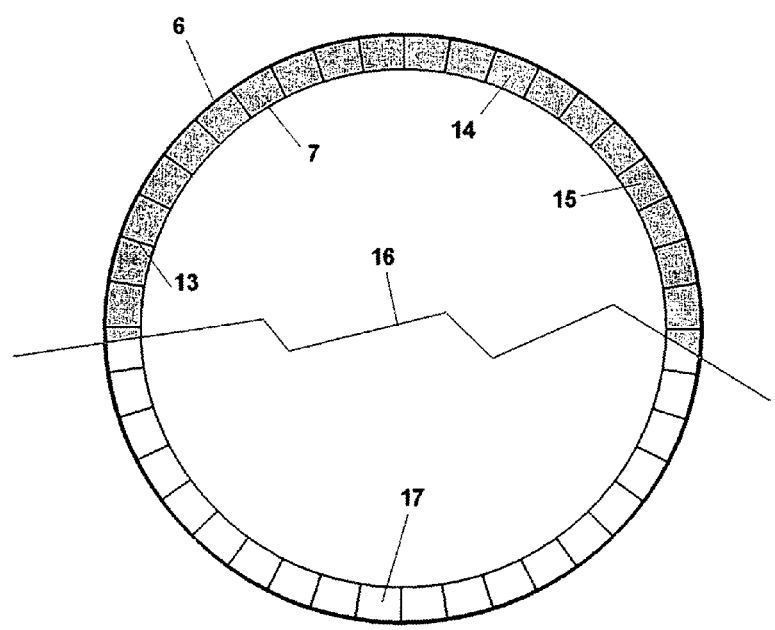
FIG. 4 shows a schematic view of the section, in a plane perpendicular to the flight axis of the aircraft, of the rear fuselage of an aircraft according to the present invention when it has suffered severe damage due to the detachment of a blade of the propeller.

As shown in FIG. 4, when severe damage occurs due to the detachment of a blade 3 of a propeller 23, the path 16 of the mentioned blade 3 causes damage 17 such that the entire section stops supporting the torque.

Figure 3:
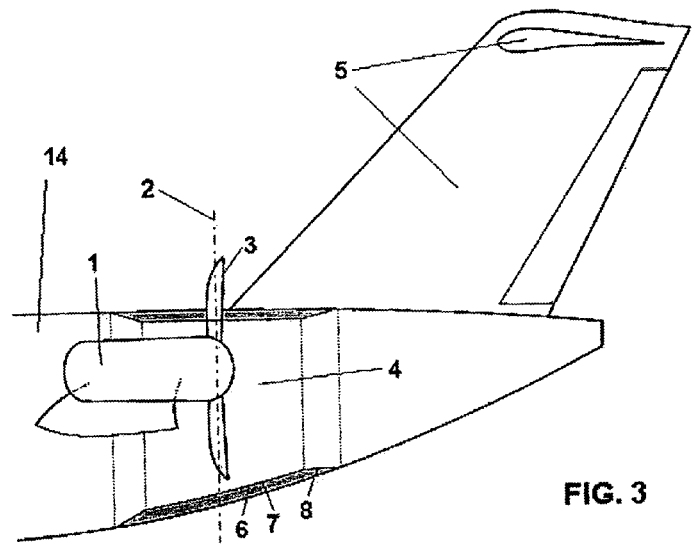
FIG. 3 shows a schematic profile view of the rear part of an aircraft with propeller engines located at the rear part thereof, and with the rear fuselage according to the present invention.

As observed in FIGS. 2 and 3, the aircraft with propeller engines 1 located at the rear part thereof can be attached to the fuselage 14 as shown in the mentioned figures, also being able to be attached to another part of the aircraft, the empennage 5 being located behind the plane 2 of the propellers 23. The fuselage 14 of said aircraft comprises an area 4 which has the risk of undergoing severe damage in the event that a blade 3 of a propeller 23 is detached and impacts the fuselage 4 with high energy.

Due to the fact that in the emergency case of the detachment of a blade 3 by a propeller engine 1, this engine stops working, the other engine 1 has to continue propelling the aircraft forwards, generating a yawing moment in the mentioned aircraft which must be balanced with a side aerodynamic force caused by the empennage 5. This force will in turn cause a torsion of the fuselage 14 which must be supported by the corresponding section of the fuselage 14.

As explained by the fundamental theory of beams subjected to torsion, the resistance of a closed section is proportional to the total area enclosed by the section, whereas the torsional rigidity of an open section is proportional to the material area of the section.

These factors show that in the event of detachment of a blade of a propeller engine located at the rear part of the aircraft with the empennage located behind the plane of the propellers, the torque generated by the empennage to balance the yawing moment caused by having a single engine propelling will be catastrophic if the blade impacts the rear fuselage and causes damage such that the section stops being closed, becoming open.

The present invention solves the previous problem by developing a section with a high torsional strength even after undergoing important damage, as shown in FIG. 4. The section comprises multiple cells 14 closed at their periphery 11 such that even though plenty of cells 14 are damaged, there will still be other closed cells 14 which can support the torsion. The height of the radial elements 13 and therefore the distance between the outer skin 6 and the inner skin 7, as well as the thickness of all the elements will be designed such that they support all the forces that the fuselage 14 must support. The number of cells 14 will be determined according to a statistical analysis of the damage that may occur in the section and according to which is the optimal number of cells 14 to be considered.

According to the invention, and to prevent the local buckling of the different structural elements due to torsion, the cells 14 will preferably be filled with porous materials, foams and other resistant materials with a low density.

According to a preferred embodiment of the invention, longitudinally along the fuselage 14 of the aircraft, as soon as the area 4 of risk of impact of the blade 3 of the propeller 23 is left, a transition area 8 of the inner skin 7 is designed in which the outer skin 6 is joined to the single skin of other areas of the fuselage 14.

Another additional advantage of the present invention is that the design of the rear fuselage 4 considerably reduces the noise caused by the propellers 23 of operating engines 1, which noise is propagated through the skin of the rear fuselage 4, reaching the passenger cabin.

The modifications comprises within the scope defined by the following claims can be introduced in the embodiment which has just been described.

The invention claimed is:

1. A combination of the structural configuration of a rear fuselage and propeller engines of an aircraft comprising propellers formed by blades, with propeller engines being located at a rear part of the aircraft and the empennage of the aircraft being located behind the plane of the propellers, wherein the structural configuration of the rear fuselage comprises a double resistant shell comprising an outer skin and an inner skin, both skins being joined by means of radial elements configuring closed cells, wherein the cells are filled with a resistant material having a low density, such that the filling of resistant material has the effect of preventing local buckling of the cells of the structural configuration, thus stabilizing the multi-cell structural configuration of the rear fuselage, such that the obtained structural configuration increases torsional strength of the rear fuselage of the aircraft with respect to torsional loads coming from the empennage of the aircraft in the event of damage of the rear fuselage due to a detachment of one of the blades of the propeller engines.

2. A structural configuration of the rear fuselage of an aircraft with propeller engines according to claim 1, wherein the material is a porous material.

3. A structural configuration of the rear fuselage of an aircraft with propeller engines according to claim 1, wherein the material is a foam.

4. A structural configuration of the rear fuselage of an aircraft with propeller engines according to claim 1, wherein the number of cells is an optimal number of cells based on a statistical analysis of the damage that may occur in the section of the rear fuselage.

5. A structural configuration of the rear fuselage of an aircraft with propeller engines according to claim 1, further comprising a transition area of the inner skin in which the outer skin is joined to a single skin of other areas of the fuselage of the aircraft, longitudinally along the fuselage of the aircraft, as soon as the area of risk of impact of the blade of the propeller engine is left.

\* \* \* \* \*